2,703,780

DESULFURIZATION BY HYDROGEN TRANSFER REACTION

Alexis Voorhies, Jr., Baton Rouge, La., assignor to Esso Research and Engineering Company, a corporation of Delaware No Drawing. Application July 22, 1950, Serial No. 175,475

7 Claims. (Cl. 196—27)

This invention relates to a novel process for removing sulfur from sulfur-containing compounds to produce relatively sulfur-free products by transfer of hydrogen from a hydrogen donor compound over an activated carbon catalyst under selective critical conditions.

It has been discovered that sulfur-containing organic compounds, as well as organic products having contaminants and impurities containing organically bound sulfur, may be freed of substantial amounts of such sulfur by contacting the sulfur-containing materials with an activated carbon catalyst in the presence of a compound adapted for use as a hydrogen donor in a hydrogen transfer reaction. Among those hydrogen donors found to be most practical and useful are the C6 naphthenes, particularly methylcyclohexane.

It is well known in the art that conventional catalytic hydrogenation reactions can be employed to remove sulfur from organic compounds containing organically bound sulfur. The problem of removing sulfur from such compounds or from mixtures containing such compounds is particularly important in conjunction with the purification of hydrocarbons found in petroleum products, coal derivatives, shale oil, etc. Although these products have generally been subjected to hydrogenation reactions, activated carbon, the catalyst used in this process, is not a good catalytic hydrogenation catalyst and would not ordinarily be expected to function as such in reactions to remove sulfur.

This invention further differs from conventional hydrogenation reactions in that molecular hydrogen is not supplied to the reaction as such, but is supplied in situ from a hydrogen donor such as a C6 naphthene or an isoparaffin. The invention is especially applicable to catalyzed reactions in which hydrogen is directly transferred from the hydrogen donor to the sulfur being removed from the organic molecule. In general, the sulfur removed from the organic compounds is subsequently converted by the hydrogen transfer reaction to a sulfide, usually hydrogen sulfide. Generally, the hydrogen transfer reaction is carried out in the vapor phase with the use of a solid activated carbon catalyst, although under certain instances, liquid acidic catalysts may also be used. The use of the selective activated carbon catalyst results in much greater selectivities in the removal of sulfur to give the desired sulfur-free products and a substantial reduction in undesirable degradation reactions of the starting materials to gaseous products and carbonaceous by-products.

Naphthenes can be defined as saturated compounds of the general formula $C_nH_{2n}$ having closed links composed of methylene groups. The naphthenic hydrocarbons which can be employed as hydrogen donors are preferably those having six cyclic carbon atoms, that is, cyclohexane and its derivatives. Naphthenic rings having four or less carbon atoms are too unstable to function satisfactorily. Alkylated derivatives of these naphthenes such as methylcyclohexane can also be employed. During the course of the reaction, the naphthenes are dehydrogenated to produce aromatic type products. For instance, when cyclohexane is used, it is converted to benzene and when methylcyclohexane is used, it is converted to toluene. The hydrogen atoms which are thus removed from the naphthenes are catalytically utilized in the presence of the activated carbon catalyst to combine with the sulfur present as organically bound sulfur in the feed stock, thereby removing the sulfur from the feed stock and converting it into an easily separable form. Cyclohexane and its higher homologues are particularly adapted for use in the role of hydrogen donors because the removal of six hydrogen atoms from cyclohexane converts it to the completely aromatized benzene.

The reaction is carried out in vapor phase in the presence of the activated carbon catalyst and under conditions of temperature, pressure, feed rates, and the like, so chosen as to produce the maximum possible removal of sulfur from the feed stock and at the same time to obtain high selectivity and relatively pure final sulfur-free products. The equipment employed for this process may be of any type known to those skilled in the art for effecting a vapor phase catalytic reaction. Thus, for example, liquid feed is charged to a vaporizer from which the resulting feed vapors pass through a preheating zone and thence into the catalytic reaction zone in which the vapors are contacted with the solid carbon catalyst. The effluent vapors from the reaction zone are subsequently cooled and condensed to produce a liquid reaction product and non-condensible gases.

The selectivity which is achieved by this process cannot readily be obtained by any other hydrogenation method. For example, catalytic hydrogenation using free hydrogen extraneously introduced in conjunction with a hydrogenation catalyst is not at all selective and uses generally a catalyst such as nickel or supported nickel, both of which are much less rugged and durable.

It is of especial advantage in the use of this hydrogen transfer process that using an activated carbon, there is a minimum of side reactions. For instance, under optimum conditions, substantially no cracking or gas formation takes place to give breakdown or decomposition products of the naphthenic compound. There is also a minimum of polymerization of the reactants and of the reaction products to give higher molecular weight condensed materials and tarry by-products.

The catalyst which has been found to be especially useful in carrying out the reaction to remove organically bound sulfur is activated carbon, a particularly sensitive catalyst which gives a minimum amount of degradative cracking reactions to produce gaseous by-products and coke. The activated carbon is derived from a variety of sources, including lignite, petroleum, coke, bituminous coal, or selected pure organic compounds. The catalyst should have a very high surface area and a relatively low content of volatile material. The amount of surface area is considered to be directly related to catalytic activity. A highly suitable carbon catalyst for this conversion is one of coal origin which has a very high surface area of the order of 1,000 to 1,100 square meters per gram of catalyst. When the catalyst is in use and is being slowly deactivated, it is believed that the surface area is actually decreased because the pores of the carbon catalyst slowly become filled with organic deposits. In order to reactivate the catalyst, these deposits must be removed from the pores of the catalyst. This removal is accomplished by a reactivation procedure. For instance, the activated carbon catalyst is regenerated by stripping with a gas such as steam, nitrogen, flue gases, etc., at elevated temperatures, i. e., 1350°–1600° F. A preferred method for regeneration of the carbon catalyst is treatment of a deactivated carbon with steam at temperatures around 1500° F. It is also possible, at least to some extent, to directly burn the organic deposits from the inactivated catalyst, but this must be done under carefully controlled conditions in order not to destroy the carbon catalyst itself at the same time.

The desulfurized reaction mixture is taken from the catalytic reaction zone and preferably condensed to a liquid comprising the reaction products and non-condensible gases. The liquid reaction product so obtained can be worked up in any suitable manner, for example, by fractionation, adsorption, or crystallization, to recover both the desulfurized feed and the aromatized hydrogen donor, as well as any hydrogenated product present as the result of the use of unsaturates in the reaction.

Any hydrogen sulfide present in the liquid may be removed by extraction, caustic washing, or by other conventional methods for removal of hydrogen sulfide. Unchanged or incompletely desulfurized reactants can be recycled, together with fresh sulfur-containing feed and fresh hydrogen donor material. If desired, an inert diluent such as, for example, a portion of the non-condensible gaseous products can be employed. It is also possible to recycle a part of the product as a diluent. Although there is no necessity for a diluent in order to obtain the desired features of the reaction, the use of some such inert material may at times be desirable to effect more efficient and simpler control of the reaction.

It will be understood that the exact conditions employed in carrying out the desulfurization reaction will be determined by the nature of the feed constituents, the desired removal of sulfur per pass, and the exact catalyst being employed. The reaction may be carried out under pressures ranging from atmospheric to superatmospheric with the restriction that the reaction must be carried out in the vapor phase. The range of pressures may vary from 1 to 100 atmospheres. However, it is best from the viewpoint of operational advantage that atmospheric pressures be employed.

In general, the range of temperatures for carrying out the desulfurization reaction will be of the order of 600°–1100° F. Optimum temperatures for the reaction are considered to be 750°–950° F. At temperatures below this range, the rate of reaction tends to fall off and become somewhat slow and the removal of sulfur is substantially incomplete, even after adequate contact with the catalyst. At temperatures higher than this limit, there is noticed an increased tendency towards the occurrence of side reactions such as thermal cracking, gas formation, polymerization, and other undesirable reactions. The total feed rates employed will generally lie in the range of 0.3 to 5 liquid volumes per volume of catalyst per hour. It is considered that the contact time may be relatively short, such as 0.1 to 1 second, to achieve optimum selectivity and satisfactory removal of sulfur.

When desulfurization of thiophene was studied in the presence of methylcyclohexane, using an activated carbon catalyst at atmospheric pressure, it was discovered that the catalyst temperature has a profound effect on the percentage of reduction in sulfur obtained in the liquid product. It was demonstrated that at temperatures around 750° F., only about 38% of the sulfur was removed. If temperatures of about 950° F. were employed, about 93% of the total sulfur in the feed was removed during the desulfurization. Temperatures intermediate between these two extremes gave the expected intermediate results. In each case, the weight of sulfur present in the feed being studied was a constant value and no extraneous hydrogen acceptor was added during the reaction. When methylcyclohexane was employed as the hydrogen donor in a hydrogen transfer reaction to remove sulfur from diethyl sulfide in the presence of 2-butene as a hydrogen acceptor and at catalyst temperatures of around 950°–975° F., it was found that approximately 84% to 92% of the sulfur content of the feed stock was removed. Under similar conditions, using thiophene as the feed stock in place of diethyl sulfide, from 40% to 50% of the sulfur was removed. Where n-heptane, a saturated paraffin not capable of functioning as a hydrogen donor, was employed in place of methylcyclohexane in an attempted desulfurization of thiophene at about 950° F., relatively poor results were obtained. These results indicated that only about 20% to 28% of the sulfur present was removed and the presence or absence of 2-butene as a hydrogen acceptor did not appear to cause appreciable difference in the results.

The amount of methylcyclohexane fed to the hydrogen transfer reaction shown in proportion to the sulfur compound fed, is best adjusted such that a substantial excess of the hydrogen donor is present in relation to the amount of sulfur compound to be desulfurized. In typical reactions, from 0.27 to 0.63 mole of sulfur compound were contacted with from 1.75 to 3.51 moles of methylcyclohexane over an activated carbon catalyst to effect desulfurization. In other words, reaction mixtures have been used to which enough naphthene has been added to provide about 2.8 to 13 moles of naphthene per mole of sulfur-containing compound present. Where a compound such as 2-butene is added to function as a hydrogen acceptor, experiments indicate from 3.64 to 4.99 moles of 2-butene in relation to the proportions of other reactants indicated above to be adequate.

As to the types of sulfur-containing feed stocks which may be desulfurized by this novel hydrogen transfer reaction, these include various types of organic materials having organically bound sulfur such as thiophene, alkylated thiophenes, and other thiophene derivatives, diethyl sulfide, diethyl disulfide, dipropyl sulfide, dibutyl sulfide, diamyl sulfide, mercaptans, various types of sulfur acids, etc. The process is especially useful for desulfurizing petroleum fractions, as for instance, naphtha fractions containing organically bound sulfur which must be removed before the fractions can be used for many purposes. In general, compounds must be used whose desulfurized products are sufficiently stable to withstand the relatively high temperatures and yet emerge from the reaction zone as intact molecules. Furthermore, the process can be applied to sulfur-containing feed materials, such as are often found in refinery streams, while processes such as catalytic hydrogenation cannot be applied since the presence of even small amounts of sulfur in conventional catalytic hydrogenation rapidly inactivates the sulfur-sensitive catalysts and renders them wholly inoperative and useless.

The process may be executed in a batch, intermediate, or continuous manner. Generally, better conversions are obtained with multi-pass processes. The catalyst may be employed in a fixed bed, moving bed, or in a fluidized manner, depending on the type of operation desired.

This invention will be better understood with reference to the following examples and tables indicating the results obtained in the desulfurization reaction of thiophene and diethyl sulfide in the presence of a hydrogen donor and, in some cases, hydrogen acceptor compounds. Results reported were obtained after a single pass operation unless otherwise specified.

EXAMPLE I

The hydrogen transfer experiments were carried out in a general way by passing the liquid feed comprising the appropriate mole ratio of methylcyclohexane and 2-butene together with the sulfur-containing compound, through a vaporizer and preheater to vaporize the feed and bring it to the desired temperature. The heated feed vapor was contacted with the activated carbon catalyst bed at the temperatures and feed rate conditions specified by the data of the table. The resulting products were condensed and analyzed as to distribution of constituents and for the residual sulfur content of the feed. In Table I shown below, the sulfur-containing feed compounds were diethyl sulfide and thiophene.

Table I
DESULFURIZATION BY HYDROGEN TRANSFER REACTIONS
[Atmospheric pressure; 200 cc. act. C catalyst—liquid feed rate 0.5 v./v./hr.]

| Feed, Hydrocarbon | Methylcyclohexane. | Methylcyclohexane. | Methylcyclohexane. | Methylcyclohexane. | n-heptane. |
|---|---|---|---|---|---|
| Sulfur Compound | Diethyl Sulfide | Diethyl Sulfide | Thiophene | Thiophene | Thiophene. |
| Vol. Percent S Cpd. in Base | 10 | 10 | 10 | 10 | 10. |
| Wt. Percent S Feed | 3.86 | 3.84 | 5.07 | 5.08 | 5.59. |
| Moles Methylcyclohexane Fed | 2.10 | 2.08 | 3.51 | 1.75 | *1.57. |
| Moles Sulfur Cpd. Fed | 0.28 | 0.27 | 0.63 | 0.32 | 0.32. |
| Moles Butene-2 Fed | 3.73 | 4.99 | 3.64 | 4.04 | 5.80. |
| Run Length, Hours | 3 | 3 | 5 | 2.5 | 2.5. |
| Avg. Block Temp., °F | 950 | 948 | 948 | 947 | 949. |
| Avg. Catalyst Temp., °F | 968 | 965 | 949 | 970 | 958. |
| Product Analysis: | | | | | |
| Carbon Wt. Percent Output | 0.5 | 0.0 | 0.9 | 0.0 | 1.7. |
| Gas Wt. Percent Output | 5.2 | 5.6 | 3.1 | 3.6 | 4.2. |
| C$_4$ Product, Wt. Percent Output— | | | | | |
| Wt. Percent Conv. C$_4$H$_8$-2 | 79.7 | 54.2 | 73.6 | 44.8 | 20.3. |
| Mole Percent Selec. to C$_4$H$_{10}$ | 111.2 | 108.7 | 122.5 | 113.4 | 144.0. |
| C$_5$ Wt. Percent Output | 0.2 | 0.5 | 0.2 | 0.7 | 1.1. |
| C$_6$ Product— | | | | | |
| Wt. Percent Feed | 77.0 | 75.4 | 82.9 | 79.3 | 62.6. |
| Vol. Percent Feed | 75.7 | 70.2 | 82.4 | 74.4 | 59.5. |
| Wt. Percent S in Liquid Product | 0.3 | 0.6 | 2.4 | 3.0 | 4.0. |
| Percent Decrease in S Content of Oil | 92.2 | 83.9 | 53.3 | 41.0 | 28.4. |

*n-Heptane (instead of methylcyclohexane).

From Table I above, it is evident that hydrogen transfer desulfurization is high with a methylcyclohexane-2-butene feed mixture in the presence of organic sulfur-containing compounds such as diethyl sulfide and thiophene. The data of the above table show that for a feed of thiophene in methyl cyclohexane the liquid product contained 2.4% sulfur as compared to 5.07% sulfur for the feed. This corresponds to a 53% reduction in sulfur content of the oil. When n-heptane was employed as a hydrogen donor in the place of methylcyclohexane, the oil product contained 4.0% sulfur as compared to 5.6% in the feed. This corresponds to a 28.3% reduction in sulfur content. It is shown that for the conversion of thiophene sulfur a naphthene rather than a straight chained paraffinic hydrocarbon is a preferred hydrogen donor.

EXAMPLE II

In Example II below, the removal of sulfur from thiophene in the presence of methylcyclohexane alone was studied at various catalyst temperatures. The data show that as the temperature is raised from 750° to 950° F., the percentage reduction in sulfur increases from 38% to 93%, indicating that within reasonable limits, the higher the temperature of the hydrogen transfer reaction, the better is the desulfurization per pass over the catalyst. In a comparable experiment, using n-heptane instead of methylcyclohexane, the percentage reduction in sulfur was only about 23%.

Table II
DESULFURIZATION BY HYDROGEN TRANSFER REACTIONS
[Feed rate: 0.5 v./v./hr.; 200 cc. act. C catalyst; atmospheric pressure; 2 hr. run length.]

| Run # | Feed Type | Wt. Percent S | Cat. Temp., °F. | Butene added, Mol. Percent of Feed | Gas Make, cu. ft./bbl. | Wt. Percent of Feed | Wt. Percent S | Percent Reduction in S |
|---|---|---|---|---|---|---|---|---|
| 1 | Thiophene in Methylcyclohexane | 4.55 | 949 | None | 1,048 | 84.2 | 0.31 | 93.2 |
| 2 | do | 4.55 | 852 | None | 163 | 88.0 | 0.85 | 81.3 |
| 3 | do | 4.55 | 805 | None | 136 | 86.7 | 1.21 | 74.1 |
| 4 | do | 4.55 | 753 | None | 32 | 90.0 | 2.80 | 38.1 |
| 5 | Thiophene in n-heptane | 5.35 | 954 | None | 937 | 63.3 | 4.13 | 22.8 |

EXAMPLE III

Data have been obtained which show that thiophene sulfur can be removed by a hydrogen transfer reaction over activated carbon catalyst using a feed of heavy virgin naphtha containing 1 volume percent thiophene. Table III shows data obtained in experiments wherein the sulfur of the thiophene was substantially removed by hydrogen transfer reactions.

Table III
DESULFURIZATION OF HEAVY VIRGIN NAPHTHA CONTAINING 1 VOLUME PERCENT THIOPHENE (0.66 WEIGHT PERCENT S)
[Conditions: 0.5 v./v./hr. feed rate; 200 cc. act. C catalyst; atmospheric pressure; 2 hr. run length.]

| Run # | 6 | 7 | 8 | 9 |
|---|---|---|---|---|
| Temp., °F | 751 | 800 | 797 | 848 |
| Feed Steam, Wt. Percent | 25 | 25 | None | None |
| Carbon, Wt. Percent | 2.6 | 0.05 | 3.4 | 1.8 |
| C$_3$—Gas, Wt. Percent | 0.9 | 2.4 | 1.0 | 3.2 |
| C$_4$+Oil, Wt. Percent | 96.5 | 97.6 | 95.6 | 95.0 |
| Oil Stabilized at 37° F.: | | | | |
| Wt. Percent of Feed | 96.4 | 97.2 | 95.3 | 93.0 |
| Wt. Percent S in Oil* | 0.60 | 0.41 | 0.30 | 0.23 |
| Percent Reduction in S Content of Oil | 9 | 39 | 54.5 | 65 |
| API Gravity | 50.4 | 52.0 | 52.6 | 52.7 |
| Bromine No. | 5 | 5 | 5 | 8 |
| Distillation, ASTM— | | | | |
| B. P., Initial °F | 225 | 212 | 200 | 185 |
| 5% @ | 246 | 242 | 239 | 214 |
| 10% @ | 251 | 248 | 248 | 232 |
| 20% @ | 258 | 256 | 256 | 244 |
| 30% @ | 268 | 264 | 264 | 256 |
| 40% @ | 279 | 272 | 272 | 264 |
| 50% @ | 292 | 284 | 282 | 272 |
| 60% @ | 306 | 297 | 294 | 284 |
| 70% @ | 327 | 311 | 306 | 296 |
| 80% @ | 356 | 329 | 325 | 312 |
| 90% @ | 540 | 358 | 348 | 336 |
| 95% @ | Cracked | 399 | 379 | 360 |
| Final B. P. | | 566 | 528 | 414 |
| Percent Recovery | 90 | 98.0 | 98.0 | 98 |
| Percent Residue | | 1.0 | 1.0 | 1.0 |
| Percent Loss | | 1.0 | 1.0 | 1.0 |

*After caustic washing.

It will be noted from a comparison of runs 6 and 7 listed above in Table III, that the presence of feed steam results in a decreased thiophene conversion. This effect has also been noted with other feed stocks. Increasing the temperature resulted in increased conversion. Table III presents data showing that the 750° F. operation which gave very little desulfurization resulted in an oil product that contained better than 10% of material boiling much higher than the feed. As the temperature was increased, the amount of high-boiling material decreased.

Conducting the reaction under 200 p. s. i. g. pressure results in greater desulfurization at a given temperature. For instance, the desulfurization obtained at 700° F. under 200 pounds' pressure is equivalent to that obtained at about 790° F. at atmospheric pressure, as indicated by the data shown in Table IV below.

Table IV
EFFECT OF PRESSURE

[Feed: Heavy virgin naphtha plus 1 volume percent thiophene (0.66 weight percent S). Conditions: 0.5 v./v./hr.; 25 weight percent steam; 200 cc. act. C catalyst; 2 hr. run length; pressure and temperature as indicated.]

| Run # | Pressure, p. s. i. g. | Temp., °F. | Coke, Wt. Percent | C₃—Gas, Wt. Percent | Wt. percent S in oil product | Percent Reduction in Sulfur |
|---|---|---|---|---|---|---|
| 10 | 200 | 700 | 1.6 | 0.5 | 0.48 | 27 |
| 11 | 0 | 750 | 2.6 | 0.9 | 0.60 | 9 |
| 12 | 0 | 800 | 0.05 | 2.4 | 0.41 | 39 |

Although the use of pressure to lower the temperature of reaction may be of only slight benefit for naphtha feed stocks, for less refractory feeds the advantages of lowering the reaction temperature would be more pronounced since, operating in this way, excessive cracking might be avoided.

All of the runs reported in Tables III and IV were made using a feed rate of 0.5 v./v./hr. Further data indicate that increasing the feed rate results in lowering the thiophene conversion, but tends to give an increase in selectivity. This is shown by the data in Table V obtained using a feed of 10 volume per cent thiophene in methylcyclohexane.

Table V
EFFECT OF FEED RATE ON DESULFURIZATION BY HYDROGEN TRANSFER

[Feed: 10 vol. percent thiophene in methylcyclohexane (4.79% S). Operating conditions: 800° F.; atmospheric pressure; 200 cc. act. C catalyst; run length adjusted to 200 cc. total feed.]

| Run # | Feed Rate, v./v./hr. | Material Balance | Products, Wt. Percent | | | Percent S in Product* | Percent Reduction in Sulfur |
|---|---|---|---|---|---|---|---|
| | | | Coke | C₃—Gas | C₄+ liquid | | |
| 13 | 0.5 | | | | 88 | 1.21 | 74 |
| 14 | **0.5 | 98.3 | 7.7 | 0.8 | 91.5 | **2.26 | 53 |
| 15 | 1 | 99.2 | 0 | 0.4 | 99.6 | 1.99 | 58 |
| 16 | 2 | 99.1 | 0.0 | 0.3 | 99.7 | 2.50 | 48 |

*After caustic washing.
**Used 25 wt. percent feed steam.

Increasing the feed rate appears to have given an increased selectivity for desulfurization. Since increasing the temperature gives greater desulfurization, it appears that operation at a high feed rate that is somewhat greater than 0.5 v./v./hr., and at a high temperature (850°-900° F.) would result in a high sulfur reduction with good selectivity for naphtha feed stocks. Broadly, temperatures of 650°-950° F., with atmospheric and superatmospheric pressures and feed rates to produce maximum desulfurization and selectivity within these temperature and pressure ranges, can be satisfactorily employed in this particular type of hydrogen transfer-desulfurization reactions.

What is claimed is:

1. In a process for effecting removal of sulfur from an organic compound containing at least 0.23 weight percent of combined sulfur by a direct transfer of hydrogen from a naphthenic hydrocarbon of at least 6 carbon atoms per molecule, the steps which comprise admixing the sulfur-containing organic compound with a sufficient amount of the naphthenic hydrocarbon to provide about 2.8 to 13 moles of naphthene per mole of sulfur-containing compound in the resulting mixture, passing the mixture into contact with a catalyst consisting of activated carbon at a temperature in the range of 650° F. to 950° F. at a rate of about 0.3 to 5 liquid volumes of mixture per volume of catalyst per hour, whereby the naphthenic hydrocarbon is dehydrogenated to a corresponding aromatic hydrocarbon and sulfur of the sulfur-containing organic compound is converted to hydrogen sulfide, carrying out said reaction with a minimum amount of degradation of the hydrocarbons to gaseous and carbonaceous byproducts, and recovering the resulting aromatic hydrocarbon product of low organic-sulfur content.

2. A process for reacting a naphthene containing at least 6 carbon atoms per molecule with thiophene, which comprises forming a mixture of the naphthene with the thiophene, in which mixture a sufficient amount of the naphthene is present to supply at least two hydrogen atoms for each atom of sulfur in the thiophene, and contacting the resulting naphthene and thiophene mixture in vapor phase with a catalyst consisting of activated carbon at 650° to 950° F. at a rate corresponding to about 0.3 to 5 liquid volumes of mixture per volume of catalyst per hour, whereby the naphthene is dehydrogenated to an aromatic hydrocarbon in transferring hydrogen therefrom directly to sulfur of the thiophene.

3. A process as defined in claim 2, in which the naphthene is principally methyl cyclohexane.

4. A process for reacting a naphthene containing at least 6 carbon atoms with a dialkyl sulfide containing at least 0.23 weight percent sulfur to convert the naphthene into an aromatic hydrocarbon by direct hydrogen transfer reaction with the dialkyl sulfide, which comprises mixing the naphthene with the dialkyl sulfide to provide a mixture containing about 2.8 to 13 moles of naphthene per mole of dialkyl sulfide, passing the resulting mixture of the naphthene and dialkyl sulfide in vapor phase into contact with a catalyst consisting of activated carbon at 650° to 950° F., and contacting said mixture with the catalyst at a rate corresponding to 0.3 to 5 liquid volumes of mixture per volume of catalyst per hour to convert the naphthene into an aromatic hydrocarbon by transfer of hydrogen from the naphthene directly to the sulfur of the dialkyl sulfide.

5. A process according to claim 4 in which the naphthene is methyl cyclohexane and the dialkyl sulfide is diethyl sulfide.

6. A process for simultaneously aromatizing naphthenes and effecting desulfurization of a petroleum naphtha fraction containing at least 0.23 weight percent of organically bound sulfur but having a relatively small naphthene content, which comprises admixing a sufficient amount of naphthenic hydrocarbons with said petroleum naphtha fraction to provide about 2.8 to 13 moles of naphthenes per mole of sulfur compound, passing vapors of the petroleum naphtha fraction enriched in naphthenes into contact with a catalyst consisting of activated carbon at a temperature of 650° F. to 950° F. at a rate corresponding to 0.3 to 5 liquid volumes of mixture per volume of catalyst per hour to transfer hydrogen directly from the naphthenes to the sulfur of sulfur-containing impurities in the petroleum naphtha fraction, and recovering a resulting mixture of aromatic hydrocarbons and petroleum naphtha hydrocarbons freed of the sulfur-containing organic impurities.

7. A process according to claim 6 in which the mixture of hydrocarbons and sulfur-containing impurities are passed into contact with the activated carbon catalyst at a feed rate greater than 0.5 volumes per volume of the activated carbon per hour.

References Cited in the file of this patent

UNITED STATES PATENTS

| | | |
|---|---|---|
| 1,884,495 | Zurcher | Oct. 25, 1932 |
| 1,913,941 | Mittasch et al. | June 13, 1933 |
| 2,411,726 | Holroyd et al. | Nov. 26, 1946 |
| 2,573,726 | Porter et al. | Nov. 6, 1951 |
| 2,606,141 | Meyer | Aug. 5, 1952 |
| 2,626,286 | Voorhies et al. | Jan. 20, 1953 |